United States Patent [19]

Booth et al.

[11] Patent Number: 4,590,097
[45] Date of Patent: May 20, 1986

[54] METHOD OF COATING DUAL PROTECTIVE LAYERS

[76] Inventors: Roger G. Booth, 9, Preston Close, Church Hill, Redditch, Worcestershire; Donald L. Bartlett, The Chestnuts, Old Church Rd., Water Orton, Birmingham, both of United Kingdom

[21] Appl. No.: 681,919

[22] Filed: Dec. 14, 1984

[30] Foreign Application Priority Data

Dec. 16, 1983 [GB] United Kingdom ............... 8333542

[51] Int. Cl.$^4$ ............................................. B05D 3/02
[52] U.S. Cl. ..................................... 427/154; 427/156; 427/407.1; 427/409
[58] Field of Search ................ 427/385.5, 407.1, 409, 427/410, 388.2, 24, 27, 154, 156

[56] References Cited

U.S. PATENT DOCUMENTS

| | | | |
|---|---|---|---|
| 3,558,564 | 1/1971 | Vasta | 427/393.5 |
| 4,150,211 | 4/1979 | Müller et al. | 528/45 |
| 4,151,152 | 4/1979 | Schmitt et al. | 528/45 |
| 4,289,682 | 9/1981 | Peters | 525/28 |
| 4,289,813 | 9/1981 | Blomeyer et al. | 427/385.5 |

FOREIGN PATENT DOCUMENTS

| | | |
|---|---|---|
| 0029598 | 11/1980 | European Pat. Off. . |
| 1252402 | 1/1970 | United Kingdom . |
| 1511935 | 4/1976 | United Kingdom . |

*Primary Examiner*—Thurman K. Page
*Attorney, Agent, or Firm*—Steele, Gould & Fried

[57] ABSTRACT

A solvent-resistant barrier coating is used beneath a polyurethane top coat, for example for coating aircraft. The barrier coating comprises a film-forming addition polymer comprising units of a vinyl aromatic monomer and units of a monomer containing a hydroxy alkyl group and a polyisocyanate containing at least 2 isocyanate groups per molecule. The addition polymer has a hydroxyl content in the range 0.5 to 5 percent by weight due to the presence of the hydroxy alkyl groups and preferably contains at least 30 percent by weight of the vinyl aromatic monomer. The ratio of isocyanate groups to hydroxyl groups is in the range 1:1 to 2:1. The polyurethane top coat can be removed from the substrate by a stripping solvent such as methylene chloride without removing the barrier coating.

6 Claims, No Drawings

METHOD OF COATING DUAL PROTECTIVE LAYERS

FIELD OF THE INVENTION

This invention relates to coating compositions for producing coatings which are resistant to organic stripping solvents such as methylene chloride, and to the resulting coatings. The invention also relates to a method of coating a substrate in which such a coating is over-coated by a coating which can be stripped off by an organic solvent. The coating compositions are particularly useful for coating aircraft.

DESCRIPTION OF RELATED ART

Aircraft are generally painted with a primer, which can for example be based on an epoxy or polyurethane resin, and a top coat which is usually based on polyurethane. The coatings must resist water and certain organic solvents such as aviation fuel and hydraulic fluids based on phosphate esters such as tricresyl phosphate or tri-n-butyl phosphate, e.g. that sold under the trade mark "Skydrol", and cannot conveniently be heat-cured so they are generally applied as two-pack coatings. Each coating is cured by the reaction of components which have been packaged separately and are mixed at or shortly before application. When an aircraft is to be repainted it is usual to remove at least the top coat before repainting, using a paint stripper based on a powerful organic solvent such as methylene chloride or tricholoroethylene. Aircraft owners and the like would prefer a paint system in which the primer remained on the aircraft to prevent the strippable solvent contacting any resins or adhesives used in the aircraft construction. The present invention seeks to provide a coating composition which can be used below a polyurethane top coat, for example as an intermediate barrier coating between the primer and the top coat, and which resists the stripping solvents commonly used to remove polyurethane coatings on aircraft.

One type of intermediate coating, described in British Pat. No. 1511935, is a non-crosslinked polyamide. This at least partially resists the solvent used to remove the top coat and can itself easily be removed by alcohol-based solvents to reveal the primer. However, aircraft owners would prefer an intermediate barrier coat which is more highly insoluble so that no solvents contact the primer. Improved adhesion between the intermediate coat and the top coat is also desirable.

Polyurethane top coats for aircraft are generally derived from a hydroxy-functional polyester and a polyisocyanate. British Pat. No. 1252402, U.S. Pat. No. 3,558,564 and European Patent Application No. 29598 describe coatings based on hydroxy-functional acrylic polymers reacted with polyisocyanates for use as finishes for cars, trucks, aircraft and railway equipment.

SUMMARY OF THE INVENTION

In a process according to the invention for providing a substrate with a strippable polyurethane coating (1) derived from a hydroxy-functional polyester and a polyisocyanate, a barrier coating (2) comprising:

(a) a film-forming addition polymer comprising units of a vinyl aromatic monomer and units of a monomer containing a hydroxy alkyl group in an amount sufficient to provide a hydroxyl content for the addition polymer in the range 0.5 to 5 percent by weight and (b) a polyisocyanate containing at least two isocyanate groups per molecule is applied to the substrate at a ratio of isocyanate groups in (b) to hydroxyl groups in (a) of 1:1 to 2:1 before the polyurethane coating (1) so that the polyurethane coating (1) can be removed from the substrate by a stripping solvent without removing the barrier coating (2).

The invention includes a coating system comprising a primer to be applied as a coat contacting the substrate and a polyurethane coating (1) derived from a hydroxy functional polyester and a polyisocyanate to be applied as the top coat, characterized by the use, as an intermediate coating between the primer and the top coat, of a barrier coating (2) as defined above.

The invention further includes a coating composition which is suitable for use as a barrier coating (2) in the process and coating system of the invention and comprises a film-forming addition polymer (a) comprising units of a vinyl aromatic monomer and units of a monomer containing a hydroxy alkyl group and a polyisocyanate (b) containing at least 2 isocyanate groups per molecule, the coating composition being characterized in that the film-forming addition polymer (a) contains at least 30 percent by weight of the vinyl aromatic monomer and sufficient hydroxy alkyl groups that it has a hydroxyl content in the range 0.5 to 5 percent by weight and in that the ratio of isocyanate groups in (b) to hydroxyl groups in (a) is 1.3:1 to 2:1.

The barrier coatings proposed herein have good resistance to stripping solvents such as those based on methylene chloride. They also have good adhesion to polyurethane-based top coats in the absence of such stripping solvents. When a stripping solvent based on methylene chloride is applied to a polyurethane top coat (1) it can generally be stripped within 30 minutes, for example in about 10 to 20 minutes, while the barrier coating composition defined above in broad terms will resist the stripping solvent even is removal is delayed for up to 16 hours after application of the stripping solvent. The barrier coating proposed, when over-coated with a polyurethane top coat, also has the advantage that when the stripping solvent is applied the polyurethane top coat blisters and begins to peel away from the barrier coating so that it can readily be removed in relatively large pieces by high pressure water hosing.

The film-forming addition polymer for the barrier coating generally contains at least 30 percent and preferably at least 50 percent by weight of units of the vinyl aromatic monomer, for maximum solvent resistance. The term "vinyl aromatic monomer" includes monomers in which the vinyl group and/or the aromatic nucleus is substituted, and the vinyl aromatic monomer can for example be styrene, vinyl toluene or alpha-methylstyrene. The hydroxy functionality of the addition polymer is preferably derived from units of a hydroxyalkyl acrylate or methacrylate such as hydroxyethyl methacrylate, hydroxyethyl acrylate, hydroxypropyl methacrylate or hydroxypropyl acrylate. Other acrylic and methacrylic esters can be used in the addition polymer, for example methyl acrylate and methyl methacrylate, as well as ethyl acrylate, butyl acrylate, hexyl acrylate and the corresponding methacrylates. The addition polymer can also contain units derived from other copolymerisable olefinically unsaturated monomers such as acrylonitrile, vinyl chloride or vinyl acetate. The molecular weight of the addition polymer is preferably 3000 to 10,000.

The polyisocyanate used in the barrier coating preferably contain 2.5 to 3.5 isocyanate groups per molecule and is preferably aliphatic, for example an adduct of hexamethylene diisocyanate containing about 3 isocyanate groups such as that sold under the trade mark "Desmodur N". An adduct of an aromatic polyisocyanate such as toluene diisocyanate having an isocyanate functionality of about 3, for example that sold under the trade mark "Desmodur L", can alternatively be used as all or part of the polyisocyanate component of the coating.

The barrier coating is generally prepared in the form of a two-pack coating composition with the hydroxy-functional addition polymer and the polyisocyanate being packaged separately, each in an organic solvent. Examples of suitable solvents are volatile aliphatic esters, aliphatic ketones, or glycol ethers or esters or mixtures thereof with each other or with aromatic hydrocarbons for the hydroxy-functional addition polymer, and glycol ether esters, optionally mixed with aromatic hydrocarbons, for the polyisocyanate. The coating can be unpigmented but is preferably lightly pigmented, for example with a pigment volume concentration of up to 30 percent, to give the coating a distinctive colour, so that a quick visual check will show whether it has remained on the substrate after stripping. The pigment can be incorporated in either constituent of the coating composition, but is preferably in the hydroxy-functional polymer component. The coating composition can contain a catalyst for the reaction of the hydroxy-functional polymer and the polyisocyanate, for example dibutyl tin dilaurate. The catalyst is preferably included in the hydroxy-functional polymer component.

The barrier coating is preferably applied by spray, for example conventional air-assisted or airless spray or electrostatic air-assisted or airless spray, using a single feed or twin feed. The two characterizing components of the coating composition are applied in such proportions that the NCO/OH ratio is 1:1 to 2:1.

Higher proportions of isocyanate within this range, preferably a NCO/OH ratio of at least 1.3:1 and most preferably at least 1.5:1, generally give increased cross-linking of the barrier coating and increased resistance to stripping solvents. If using a twin spray, the relative feed rates of these two components can be adjusted to give this ratio. Alternatively these two components of the coating composition can be mixed together, preferably in simple ratios by volume selected to give the desired NCO/OH ratio, shortly before application. The pot life of the coating composition after mixing is generally up to 16 hours but is dependent on temperature and humidity.

The invention is illustrated by the following Example in which parts are by weight.

EXAMPLE 12 parts butyl acetate and 26 parts xylene were charged to a reactor and heated to 135° C. A mixture of 26.7 parts styrene, 7.4 parts ethylhexyl acrylate, 4.4 parts hydroxyethyl acrylate and 0.78 part benzoyl peroxide was added over 3 hours. After a further hour 0.08 part di-t-butyl peroxide was added and heating was maintained for a further hour to achieve a non-volatile content of 50 percent. The resulting polymer solution was clear and white with a viscosity of 3 to 4 poise. The polymer produced had a hydroxyl content of 1.68 percent on a dry weight basis.

583 parts on the polymer solution produced were blended with 324 parts pigments (rutile titanium dioxide, barytes, talc and synthetic silica), 56 parts additional solvent (xylene and butyl actetate), 1 part green tinter and 0.03 part dibutyltin dilaurate to produce the hydroxy-functional component of a coating composition according to the invention.

730 parts "Desmodur N" polyisocyanate, which is an adduct of hexamethylene diisocyanate containing about 3 isocyanate groups per molecule, was diluted with 160 parts xylene and 160 parts butyl acetate to provide the polyisocyanate component of the coating composition.

The two components of the coating composition were mixed in equal volumes and were sprayed onto an aluminium panel which had been coated with a two-pack epoxy primer. The NCO/OH ratio of the coating composition was 1.6:1. The coating was allowed to dry at ambient temperature.

When it had dried the coating was over-coated with a two-pack polyurethane paint of a type commonly used as a topcoat for aircraft and based on "Desmophen 650" hydroxy-functional polyester and "Desmodur N" polyisocyanate and having an NCO/OH in the range from 1.0:1 to 1.5:1. The topcoat was allowed to dry at ambient temperature.

The coating system was tested using the stripping solvent specified in Ministry of Defence Standard 80-16 which comprises 64 parts methylene chloride, 15 parts refined cresylic acid, 10 parts methanol, 4 parts water, 3 parts cellulose thickener, 2 parts toluene-4-sulphonic acid, 1 part surfactant and 1 part paraffin wax. The stripping solvent was spread over the coating and after about 15 minutes the top coat began to form large blisters, many of which burst, so that after 25 minutes the top coat could readily be peeled from the panel. The barrier coating produced by the coating composition of the invention, which could be distinguished by its pale greeen colour, remained intact.

What is claimed is:

1. A process for providing a substrate with a strippable polyurethane coating (1) derived from a hydroxy-functional polyester and a polyisocyanate, characterized in that a barrier coating (2) comprising:
    (a) a film-forming addition polymer comprising units of a vinyl aromatic monomer and units of a monomer containing a hydroxy alkyl group in an amount sufficient to provide a hydroxyl content for the addition polymer in the range 0.5 to 5 percent by weight and
    (b) a polyisocyanate containing at least two isocyanate groups per molecule
is applied to the substrate at a ratio of isocyanate groups in (b) to hydroxyl groups in (a) of 1:1 to 2:1 before the polyurethane coating (1) so that the polyurethane coating (1) can be removed from the substrate by a stripping solvent without removing the barrier coating (2).

2. A process according to claim 1, characterized in that the film-forming addition polymer (a) contains at least 50 percent by weight of units of the vinyl aromatic monomer.

3. A process according to claim 1, characterized in that the monomer containing a hydroxy alkyl group is a hydroxy alkyl acrylate or methacrylate.

4. A process according to claim 1, characterised in that the film-forming addition polymer (a) has a molecular weight of 3000 to 10000.

5. A process according to claim 1, characterized in that the polyisocyanate (b) contains an average of 2.5 to 3.5 isocyanate groups per molecule.

6. A process according to claim 1, characterised in that the ratio of isocyanate groups in (b) to hydroxyl groups in (a) is in the range 1.5:1 to 2:1.

* * * * *

UNITED STATES PATENT AND TRADEMARK OFFICE
CERTIFICATE OF CORRECTION

PATENT NO.   : 4,590,097

DATED        : May 20, 1986

INVENTOR(S)  : Booth and Bartlett

It is certified that error appears in the above-identified patent and that said Letters Patent is hereby corrected as shown below:

On the title page

[73]  Assignee: International Paint Public Limited Company, London, England.

Signed and Sealed this

Fourteenth Day of October, 1986

[SEAL]

Attest:

DONALD J. QUIGG

Attesting Officer

Commissioner of Patents and Trademarks